(12) United States Patent
Abrahams et al.

(10) Patent No.: US 10,341,459 B2
(45) Date of Patent: Jul. 2, 2019

(54) PERSONALIZED CONTENT AND SERVICES BASED ON PROFILE INFORMATION

(71) Applicant: INTERNATIONAL BUSINESS MACHINES CORPORATION, Armonk, NY (US)

(72) Inventors: Faried Abrahams, Laytonsville, MD (US); Amol A. Dhondse, Pune (IN); Kerrie L. Holley, Montara, CA (US); Anand Pikle, Pune (IN); Gandhi Sivakumar, Melbourne (AU); Lennox E. Thomas, Decatur, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 221 days.

(21) Appl. No.: 14/858,407

(22) Filed: Sep. 18, 2015

(65) Prior Publication Data

US 2017/0086029 A1      Mar. 23, 2017

(51) Int. Cl.
*H04L 29/08*      (2006.01)
*H04W 4/029*      (2018.01)

(52) U.S. Cl.
CPC ........... *H04L 67/306* (2013.01); *H04W 4/029* (2018.02)

(58) Field of Classification Search
None
See application file for complete search history.

(56) References Cited

U.S. PATENT DOCUMENTS 6,484,179 B1    11/2002  Roccaforte
6,590,507 B2     7/2003  Burns
(Continued)

FOREIGN PATENT DOCUMENTS

WO    2008154648    12/2008
WO    2010129194    11/2010

OTHER PUBLICATIONS

Office Action dated May 23, 2017 in related U.S. Appl. No. 14/606,058, 12 pages.
(Continued)

*Primary Examiner* — Arpan P. Savla
*Assistant Examiner* — Soheila (Gina) Davanlou
(74) *Attorney, Agent, or Firm* — Christopher K. McLane; Andrew M. Calderon; Roberts Mlotkowski Safran Cole & Calderon P.C.

(57) ABSTRACT

An approach includes a system implemented in a computer infrastructure including a processor. The approach further includes the processor configured to receive dimensionally aware linkages. The approach further includes the processor configured to retrieve aggregated data from a data set. The approach further includes the processor configured to identify at least one affinity cluster related to the dimensionally aware linkages in at least two dimensions and the retrieved aggregated data by performing at least one lookup linkage which matches at least one dimension of the at least two dimensions of the dimensionally aware linkages with the retrieved aggregated data. The approach further includes the processor configured to provide personalized content to a user having same or similar user preferences as the received dimensionally aware linkages based on the identified at least one affinity cluster.

17 Claims, 7 Drawing Sheets

(56) References Cited

U.S. PATENT DOCUMENTS

| | | |
|---|---|---|
| 6,681,231 B1 | 1/2004 | Burnett |
| 6,985,929 B1 | 1/2006 | Wilson et al. |
| 7,107,286 B2 | 9/2006 | Burnett |
| 7,366,732 B2 | 4/2008 | Creeth |
| 7,486,201 B2 | 2/2009 | Kelly et al. |
| 7,827,208 B2 | 11/2010 | Bosworth et al. |
| RE41,893 E | 12/2010 | Wallner |
| 7,873,466 B2 | 1/2011 | Kong |
| 7,979,445 B2 | 7/2011 | Mason |
| 8,160,980 B2 | 4/2012 | Da Silva Fernandes et al. |
| 8,341,029 B1 | 12/2012 | Ramalingam et al. |
| 8,489,596 B1 | 7/2013 | Milton et al. |
| 8,493,442 B2 | 7/2013 | Fernandez et al. |
| 8,495,007 B2 | 7/2013 | Williamson |
| 8,498,835 B2 | 7/2013 | Degani |
| 8,589,407 B2 | 11/2013 | Bhatia |
| 8,600,984 B2 | 12/2013 | Fleischman et al. |
| 2008/0120029 A1 | 5/2008 | Zelek et al. |
| 2009/0327508 A1 | 12/2009 | McCarthy et al. |
| 2010/0082780 A1 | 4/2010 | Muilenburg et al. |
| 2010/0228574 A1 | 9/2010 | Mundinger et al. |
| 2010/0280748 A1 | 11/2010 | Mundinger et al. |
| 2011/0016154 A1 | 1/2011 | Goyal et al. |
| 2011/0313996 A1 | 12/2011 | Strauss et al. |
| 2012/0290950 A1 | 11/2012 | Rapaport et al. |
| 2013/0006521 A1 | 1/2013 | Needham et al. |
| 2013/0018957 A1 | 1/2013 | Parnaby et al. |
| 2013/0097246 A1* | 4/2013 | Zifroni .................. G06Q 50/01 709/204 |
| 2013/0097715 A1* | 4/2013 | Fourman ........... G06F 17/30867 726/26 |
| 2013/0144957 A1 | 6/2013 | Sherman et al. |
| 2013/0198308 A1 | 8/2013 | Yang et al. |
| 2013/0268193 A1 | 10/2013 | Kritt et al. |
| 2014/0108320 A1 | 4/2014 | Baca et al. |
| 2014/0245352 A1 | 8/2014 | Tseng et al. |
| 2014/0372250 A1 | 12/2014 | Dugan |
| 2017/0154376 A1* | 6/2017 | Mirchandani ...... G06Q 30/0631 |

OTHER PUBLICATIONS

Saito H. et al.,"Learning from location history and its context for collaborative people behavioral prediction", AN-14065926, 2013.

IBM., "Without Session Affinity, how to process business data in a clustering J2EE environment with high performance and fail over support" IP.com No. 000149870, Apr. 11, 2007, 27 pages.

Brown.,"Environmental Assessment Criteria to Be Taken into Consideration for Selection of Locations of Petroleum Projects" IPCOM000219892; Jul. 17, 2012, 36 pages.

Walenz et al.,"Exploring Social Contexts along the Time Dimension: Temporal Analysis of Named Entities", IEEE International Conference on Social Computing, Publication date 2010, 5 pages.

Maxwell., Google's Time Dimension—It will Accelerate Corporate Social Media, http://blog.openviewpartners.com/googles-time-dimension-it-will-accelerate-corporate-social-media/, Jun. 6, 2010, 8 pages.

Klais.,"How Google's Time Dimension Will Disrupt Your SEO"., http://searchengineland.com/how-googles-time-dimension-will-disrupt-your-seo-43644, Jun. 6, 2010, 9 pages.

Specification "Representation of Time-Sensitive and Space-Sensitive" for related U.S. Appl. No. 14/606,058, 50 pages.

"List of IBM Patents or Patent Applications Treated as Related" 1 page.

Office Action dated Nov. 30, 2017 in related U.S. Appl. No. 14/606,058, 23 pages.

Notice of Allowance dated Nov. 20, 2018 in related U.S. Appl. No. 14/606,058, 8 pages.

Final Office Action dated Jun. 26, 2018 in related U.S. Appl. No. 14/606,058, 30 pages.

\* cited by examiner

PERSONALIZED CONTENT AND SERVICES BASED ON PROFILE INFORMATION

FIELD OF THE INVENTION

The present invention generally relates to methods and systems for providing personalized content and services based on profile information and, more particularly, to methods and systems for providing personalized content and services based on profile information that is sensitive to time and location.

BACKGROUND

The advancement of mobile devices and embedded software has resulted in an exponential increase in people having instant access to a wide range of information and analytical data. For example, cloud computing and real-time data analytics has brought the capability to process large workloads of data and perform real-time analytical processing to derive unique insights from both structured and unstructured data.

In insight based analytics, a data collection engine collects data from various internal and external sources and performs actions based on these various sources. For example, insight based analytics may derive personalized insights, content, services, and recommendations based on the collected data.

SUMMARY

In a first aspect of the invention, a system is implemented in a computer infrastructure which includes a processor configured to receive, by the processor, dimensionally aware linkages in at least two dimensions which include a time period and a location on a geospatial map. The processor is further configured to retrieve aggregated data from a data set of mobile data, social media data, Internet data, private network data, and cloud computing data. The processor is further configured to identify at least one affinity cluster related to the dimensionally aware linkages in the at least two dimensions and the retrieved aggregated data by performing at least one lookup linkage which matches at least one dimension of the at least two dimensions of the dimensionally aware linkages with the retrieved aggregated data. The processor is further configured to provide personalized content to a user having same or similar user preferences as the received dimensionally aware linkages based on the identified at least one affinity cluster. The dimensionally aware linkages associate the time period and the location together to form linkages in the at least two dimensions.

In another aspect of the invention, there is a method which includes receiving, by a computer processor, a request for a profile affinity which comprises at least two dimensions which includes at least two dimensions including a time period and a location on a geospatial map. The method further includes comparing, by the computer processor, at least one dimension of the profile affinity which comprises the at least two dimensions with aggregated data in order to find a match between the at least one dimension of the profile affinity which comprises the at least two dimensions and the aggregated data. The method further includes increasing, by the computer processor, a confidence level for providing personalized content in response to the match existing between the at least one dimension of the profile affinity and the aggregated data. The method further includes decreasing, by the computer processor, the confidence level for providing the personalized content in response to the match not existing between the at least one dimension of the profile affinity and the aggregated data. The method further includes the aggregated data including a data set of mobile data, social media data, Internet data, private network data, and cloud computing data. The profile affinity associates the time period and the location together to form linkages in the at least two dimensions.

In a further aspect of the invention, there is a computer program product for providing at least one service, the computer program product includes a computer readable hardware storage device having readable program code stored thereon. The computer program product includes first program code executed by a processor to obtain dimensionally aware linkages in at least two dimensions which include a time period and a location on a geospatial map. The computer program product further includes second program code executed by the processor to obtain aggregate data from a data set of mobile data, social media data, Internet data, private network data, and cloud computing data. The computer program product further includes third program code executed by the processor to identify at least one affinity cluster related to the user preferences in the at least two dimensions and the obtained data by performing at least one lookup linkage which matches at least one dimension of the at least two dimensions of the dimensionally aware linkages with the obtained aggregated data. The computer program product further includes fourth program code executed by the processor to provide the at least one service to a user having same or similar user preferences as the obtained dimensionally aware linkages based on the identified at least one affinity cluster. The dimensionally aware linkages associate the time period and the location together to form linkages in the at least two dimensions.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to methods and systems for providing personalized content and services based on profile information and, more particularly, to methods and systems for providing personalized content and services based on profile information that is sensitive to time and location. More specifically, the present invention provides systems and methods that provide a repeatable and reusable approach for modeling time and location sensitive profile information which can be instantiated, aggregated, managed, and retrieved dynamically in real-time (physical vicinity based) to derive accurate insights from a large volume of real-life events that are available from sources such as mobile, social media, machine-generated data, etc.

The systems and methods provided herein provide a standard mechanism to accurately predict individual inclinations and provide personalized content and services based on profile information that is sensitive to time and location. The profile information may be retrieved from processing multiple streams of big data, in multi-tenant cloud and known environments. Further, the systems and methods provided herein provide a defined mechanism to aggregate profile information in time and space dimensions to retrieve predictions/preferences for a set of one or more individuals (e.g., family, friends, and co-workers) when they are co-located physically and provide personalized content and services based on their cumulative dispositions and interests.

Moreover, compared to known systems which rely on a single dimension of profile information for deriving insights from data being processed, results of the systems and methods provided herein occur in a predictable and/or high level of confidence. In other words, relying on two dimensions results in personalized content and services with a high level of confidence. Also, compared to known systems, heavy resource and computational intensive processing is no longer required to derive insights from data being processed that are dependent on time and geospatial information.

In embodiments, the systems and methods described herein provide the following advantageous features and functions:

i) Represent real-world profiles as a function of time and space for better accuracy in data processing;

ii) Aggregate preferences across a set of one or more individuals to perform predictive personalization of content and services, based on time and location;

iii) Provide a run-time framework that analyzes actual usage across specific dimensions and dynamically moves the data within one or more dimensions to/from memory to storage; and iv) Apply multiple permutations of transformation patterns, such as aggregation and filtering of data based on multi-dimension association with time and location, enabling vendors to provide this as infrastructure as a service (IaaS) or platform as a service (Paas) implementations to consumers;

v) Administer and manage location and time sensitive linkages and affinity clusters; and vi) Combine dynamic and static dimension association with time and location, enabling dynamic re-usable result sets.

In further embodiments, a physical vicinity based location and time sensitive personalized adviser (computing systems and/or infrastructure) is configured to provide the following features and/or functionality:

i) Create profiles for a set of individuals who are co-located at specified time intervals;

ii) Aggregate and manage real-world profile information as a function of time and space, for better accuracy in data processing;

iii) Provide personalized content and services based on a current location vicinity and time;

iv) Provide a run-time framework that analyzes actual usage across specific dimensions and dynamically moves data within one or more dimensions from memory to storage;

v) Leverage the intelligence of physical vicinity identification using mobile devices for space, time varying service delivery; and vi) Apply multiple permutations of transformation patterns such as aggregation and filtering of data based on multi-dimension association with time and location, enabling vendors to provide this as IaaS or PaaS implementations to consumers.

In embodiments, a system implemented in a computer infrastructure including a processor and/or a method described herein associates profiles to a set of one or more individuals, such as family, friends, co-workers, a private group of travelers, etc., during time intervals when they are co-located. Further, the system implemented in the computer infrastructure including the processor and/or the method described herein provides personalized content and services based on their cumulative dispositions and interests. The system implemented in the computer infrastructure including the processor and/or the method described herein also provides the ability to create profiles for one or more individuals who may be co-located, such as individuals of a family who live under a same house, individuals who are traveling together in a vehicle, individuals who work at a same work location, etc. The system implemented in the computer infrastructure including the processor and/or the method described herein also provides personalized content (such as an audio/video selection, television programs, and campaigns) and services (such as insights, recommendations, and alerts). The system implemented in the computer infrastructure including the processor and/or the method described herein also may set priorities based on a demographic profile and/or sensibility of individuals. The system implemented in the computer infrastructure including the processor and/or the method described herein also provides a framework to analyze space and time-sensitive user behavior generated from real-world events, such as social media, machine generated events, etc., and derive aggregated insights regarding user's inclination to various subjects in a context of a user's current location and time.

In more specific embodiments, the system implemented in the computer infrastructure including the processor and/or the method described herein leverage linkages that are created based on a user's behavioral events to derive extended relationships and aggregated insights. Linkages are associations between various categories (e.g., location, vicinity, time, and subject) in a context of time and space. Also, profile linkages associate the various categories together in a profile for at least one individual in a context of time and space. Further, the system implemented in the computer infrastructure including the processor and/or the method described herein also traverses across the linkages based on user preferences to create affinity clusters that are derived based on common interests. The system implemented in the computer infrastructure including the processor and/or the method builds affinity clusters for common interest groups whose size is greater than a configurable threshold. In an embodiment of the present invention, the computer infrastructure may comprise a profile crawler to perform these functions. It should be understood that the term "profile crawler" is used herein for sake of convenience and description; however, other terms can also be applied to the systems and methods described herein. In any event, in embodiments, the system implemented in the computer infrastructure including the processor and/or the method crawls across multiple linkage repositories to generate aggregated insights (i.e., affinity clusters) to generate an object graph of these affinity clusters, referenced by time and space. As a non-limiting example, assume that John loves trucks. The system implemented in the computer infrastructure including the processor and/or the method would identify other truck lovers and this would be identified as an affinity cluster. The system implemented in the computer infrastructure including the processor and/or the method may also set a level of confidence for these insights based on a traversal extent across the profile linkages. For example, if a majority of truck lovers prefer audio speakers, the profile crawler may infer that most truck lovers prefer audio speakers, albeit at a lower confidence level than if there was a direct relation established for a given individual.

In additional embodiments, the system implemented in the computer infrastructure including the processor and/or the method described herein identify patterns in similar linkages to identify the "next best" linkages and associating level of confidence in terms of accuracy of insights/outcomes based on relevance of these associations in multiple dimensions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
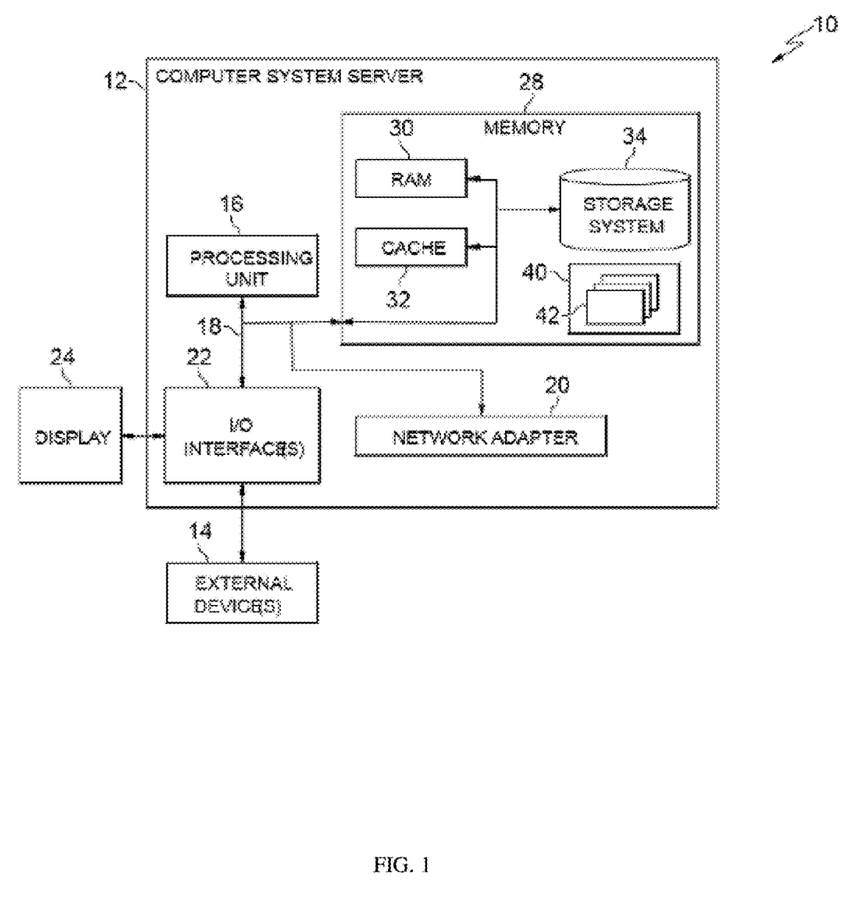
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
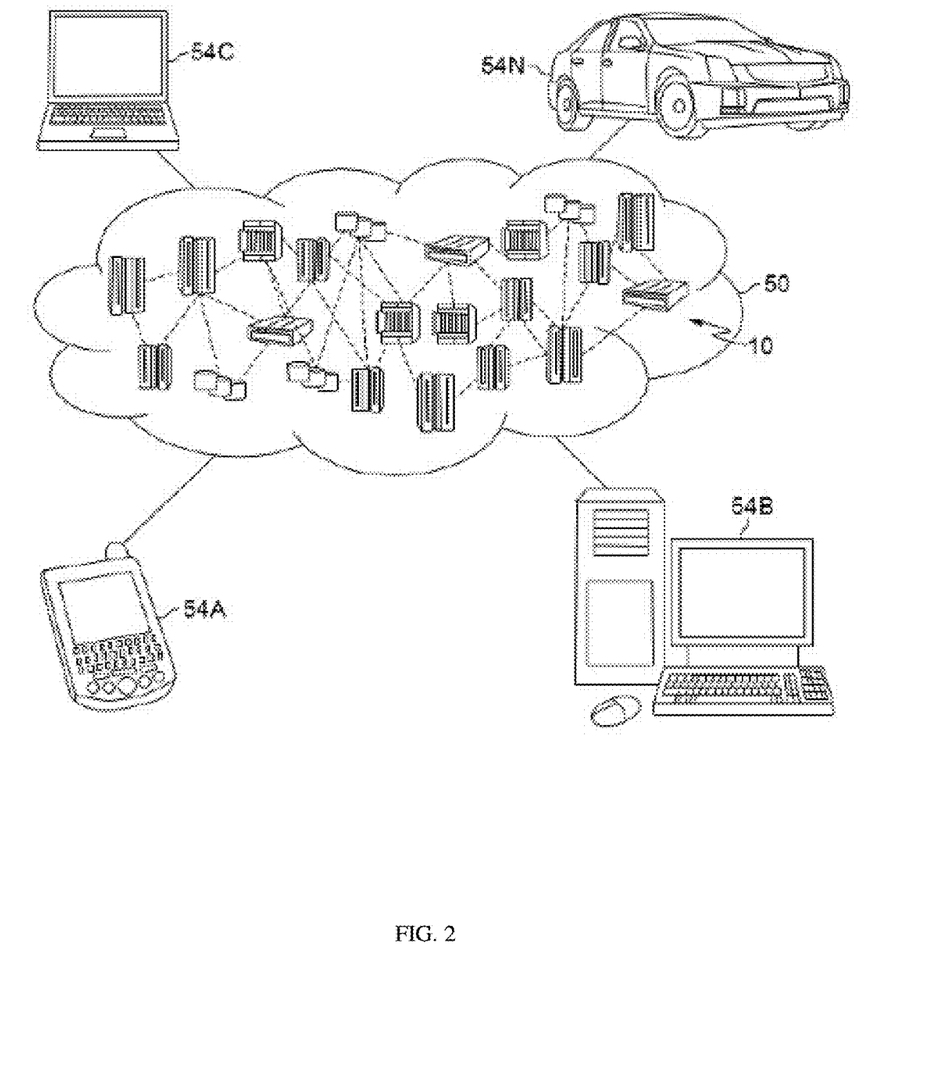
FIG. 2 depicts a cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
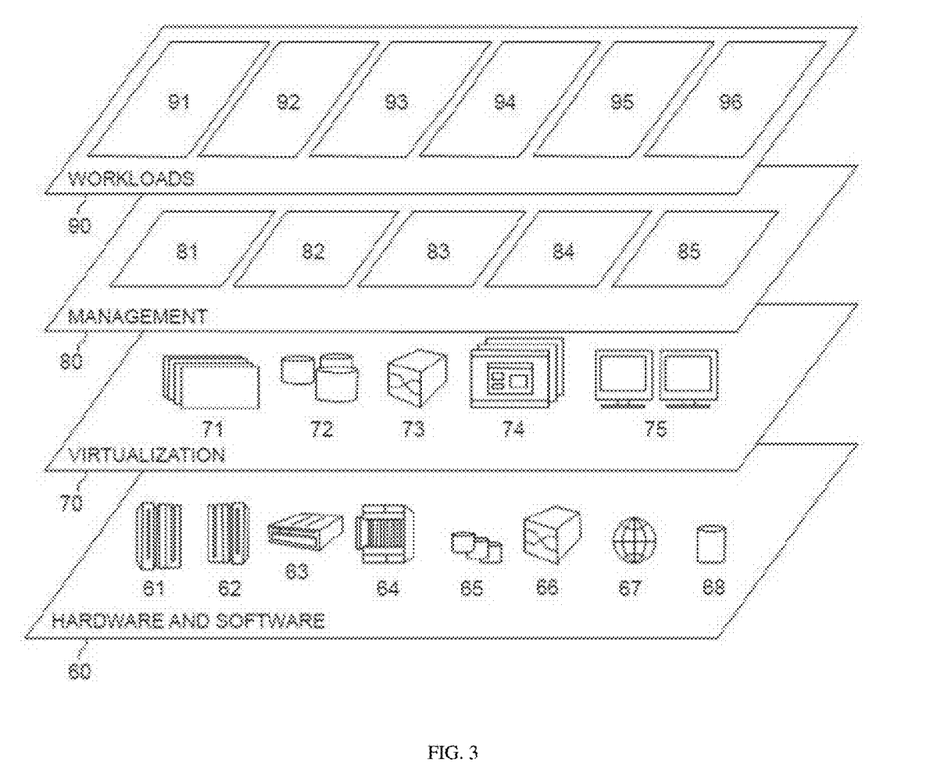
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personalized content and services processing 96, which is based on profile information that is sensitive to time and location described herein. In accordance with aspects of the invention, the personalized content and services processing 96 operates to perform one or more of the processes described herein. For example, the personalized content and services processing 96 performs personalized content and services based on profile information which is sensitive to time and location.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
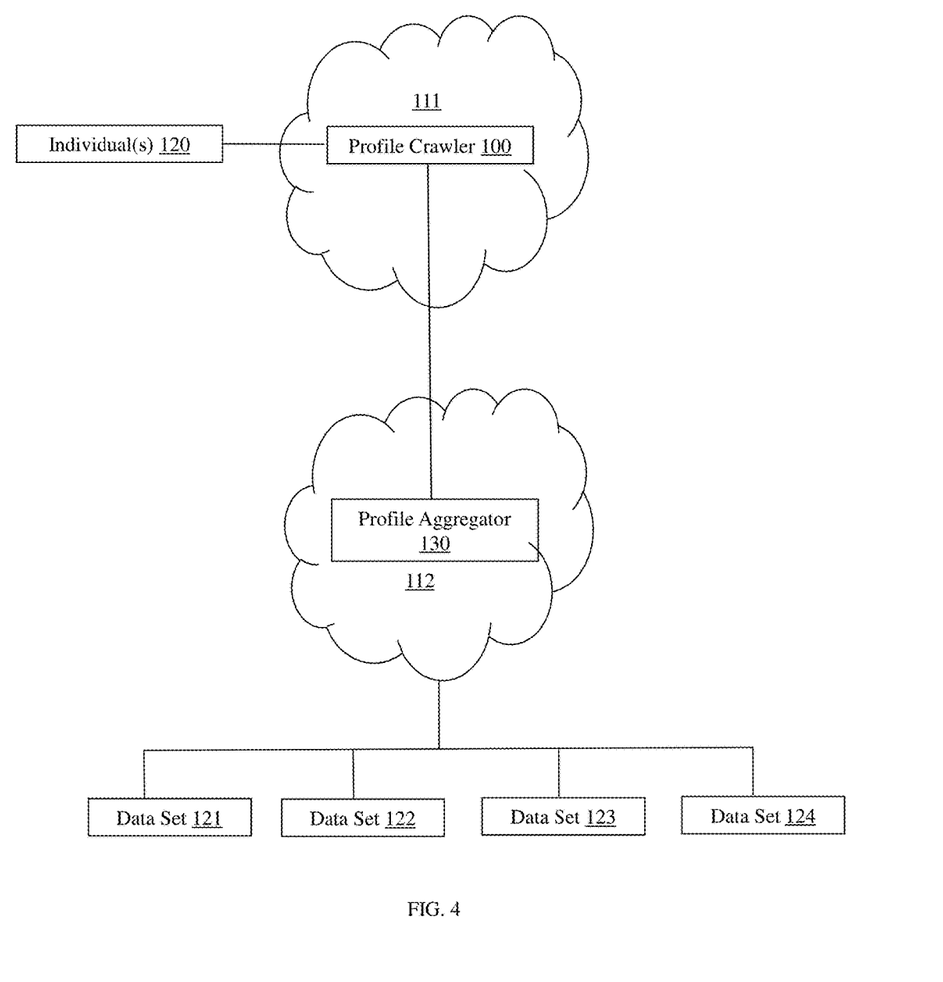
FIG. 4 depicts an example of providing personalized content and services to individual(s) in accordance with aspects of the present invention.

In accordance with aspects of the invention and with reference to FIGS. 1 and 4, for example, a profile crawler 100 can be implemented as one or more program code in program modules 42 stored in memory as separate or combined modules. Additionally, profile crawler 100 may be implemented as dedicated processors or a single or several processors to provide the function of these tools. While executing the computer program code, the processing unit 16 can read and/or write data to/from memory, storage system, and/or I/O interface 22. The program code executes the processes of the invention.

By way of example, referring to FIGS. 2 and 4, profile crawler 100 may be configured to retrieve aggregated data via the cloud computing environment 50. As discussed with reference to FIG. 2, for example, cloud computing environment 50 may be the Internet, a local area network, a wide area network, and/or a wireless network. After profile crawler 100 retrieves and aggregates the data via the cloud computing environment 50, profile crawler 100 may send the data to individual(s) 120 via the cloud computing environment 50.

More specifically, FIG. 4 depicts an example of providing personalized content and services to individual(s) in accordance with aspects of the present invention. In FIG. 4, data is aggregated from data sets 121-124, and a machine (e.g., a profile crawler 100) may provide personalized content and services to individual(s) 120 based on the aggregated data. In an embodiment of the present invention shown in FIG. 4, for example, profile crawler 100 is included in a first cloud computing environment 111 and a profile aggregator 130 is included in a second cloud computing environment 112. First cloud computing environment 111 and second cloud computing environment 112 operates in a similar fashion to cloud computing environment 50 in FIG. 2.

Further, profile aggregator 130 receives data from data sets 121-124. One of ordinary skill in the art would understand that data sets 121-124 are non-limiting and illustrative examples, and profile aggregator 130 can receive data from one or more data sets. Further, in FIG. 4, each the data sets 121-124 may represent different data sources, such as mobile devices, social media, machine-generated, the Internet, private networks, cloud computing, navigation devices, vehicles, etc. For example, data set 121 may be data from a mobile device, data set 122 may be data from social media, data set 123 may be data from a navigation device, and data set 124 may be machine-generated. Profile aggregator 130 is configured to aggregate all the data from each of the one or more data sets and transmit the aggregated data to the profile crawler 100. In particular, the profile aggregator 130 may be configured to retrieve raw data from each of the one or more data sets (e.g., data sets 121-124), filter the raw data for individual insights such as interests, likes, and/or preferences, and aggregate the filtered data together in an insight database. In FIG. 4, profile crawler 100 retrieves the aggregated data from the insight database via profile aggregator 130. The aggregated data from the insight database may be used by the profile crawler 100 to create an initial linkage between various categories (e.g., location, vicinity, time, and subject) in a context of time and space. Moreover, the initial linkages created by the profile crawler 100 may be stored in the insight database or a separate linkage database. The profile crawler 100 in FIG. 4 is configured to provide personalized content and services to individual(s) 120 based on aggregated data that is sensitive to time and location.

Embodiments of the present invention enable real-time prediction based on aggregated insights generated by profile crawler. Further, in FIG. 4, profile crawler 100 may retrieve relevant results based on priorities, which are set based on individual users and their preferences, and identify affinities based on a specific location (e.g., a set of latitude and longitude pairs) and a time period. Further, in FIG. 4, profile crawler 100 provides a capability to return more relevant results by broadening a location area (e.g., zooming out in a map) or a time period (e.g., moving up in a time graph), in order to broaden linkages and affinities.

Moreover, in FIG. 4, embodiments enable profile crawler 100 to self-learn and enrich its base of profile linkages and affinities to apply them to real-world events when performing run-time data processing. The profile crawler 100 has the ability to self-learn based on behavioral patterns, revalidate, and break linkages and affinities in one or more dimensions. Further, profile crawler 100 connects to a self enriching repository which is continuously evolving associations with multiple dimensions.

Figure 5:
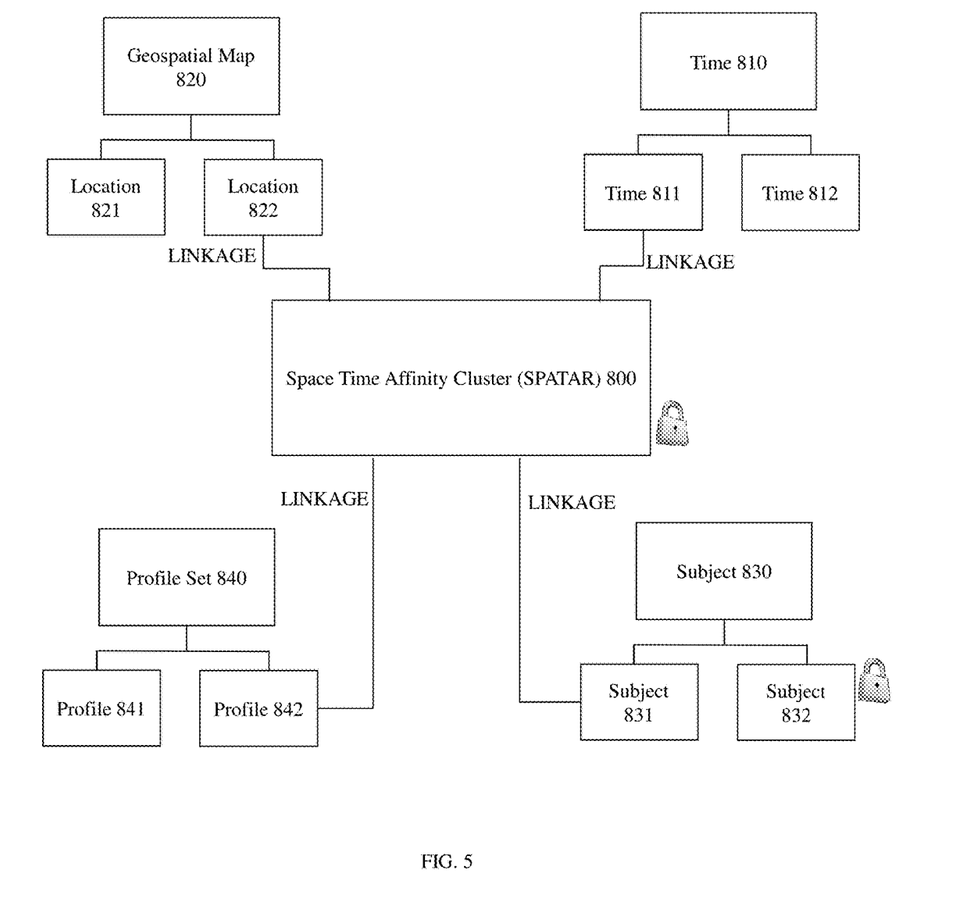
FIG. 5 depicts an object model for representing affinity clusters in accordance with aspects of the present invention.

FIG. 5 depicts an object model for representing affinity clusters in accordance with aspects of the present invention. In FIG. 5, a space time affinity cluster (SPATAR) 800 is generated by, e.g., profile crawler, using one or more structures. In FIG. 5, SPATAR 800 is linked to one or objects, such as a geospatial map, a time, a subject, and a profile set. In an example, SPATAR 800 may be linked to time 811, location 822, profile 842, and subject 831. In a specific non-limiting example of FIG. 5, SPATAR 800 may be linked to December 2012, New York City, John Doe, and Holiday Party (e.g., representing time 811, location 822, profile 842, and subject 831); although other examples are contemplated herein. Therefore, SPATAR 800 is a linkage of location, vicinity, time, and subject which will enable real-time prediction based on aggregated insights generated by profile crawler. Further, in FIG. 5, SPATAR 800 and subject 832 may be privately locked and only accessible to a certain predefined group of people based on a confidentiality policy set by a user or an organization.

In FIG. 5, embodiments may return objects based on their relevance to SPATAR 800. Further, SPATAR 800 may manage time and space sensitive profile information and usage in multi-tenant environments. SPATAR 800 also enforces user or organizational confidentiality policies associated with processing private data, as well as versioning. For example, organizational confidentiality policies may ensure that private data, such as an individual's financial or health information, is only accessed by authorized individuals through access controls. Further, versioning allows archiving of historical information that has been previously linked and which may be replaced with newer linkage information. SPATAR 800 also accesses policies based on one or more dimensions. Further description of generating the space time affinity clusters (SPATARs) will be described with respect to FIGS. 6-7.

Flow Diagram

Figure 6:
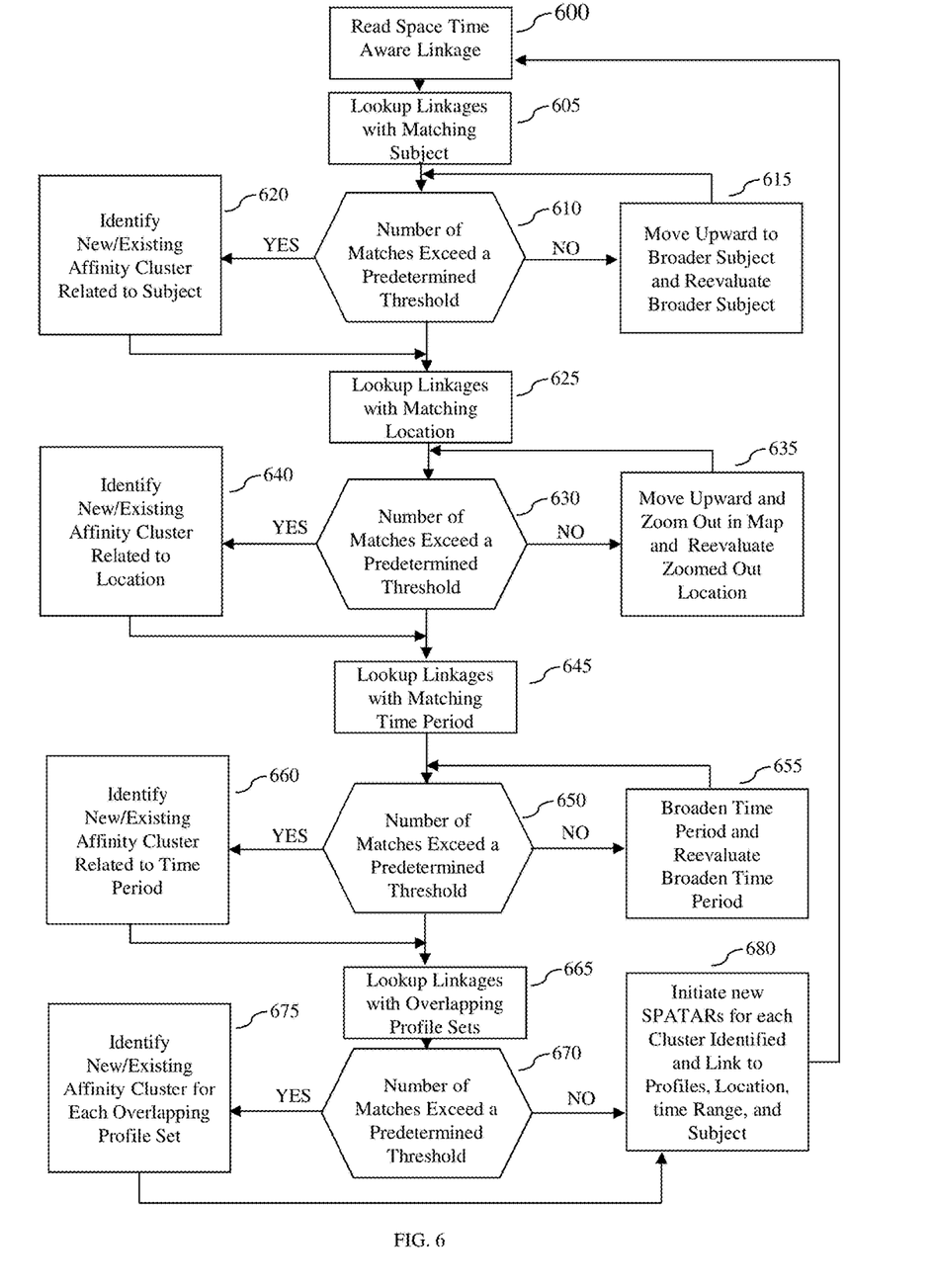
FIG. 6 depicts an exemplary flow for a process in accordance with aspects of the present invention.
Figure 7:
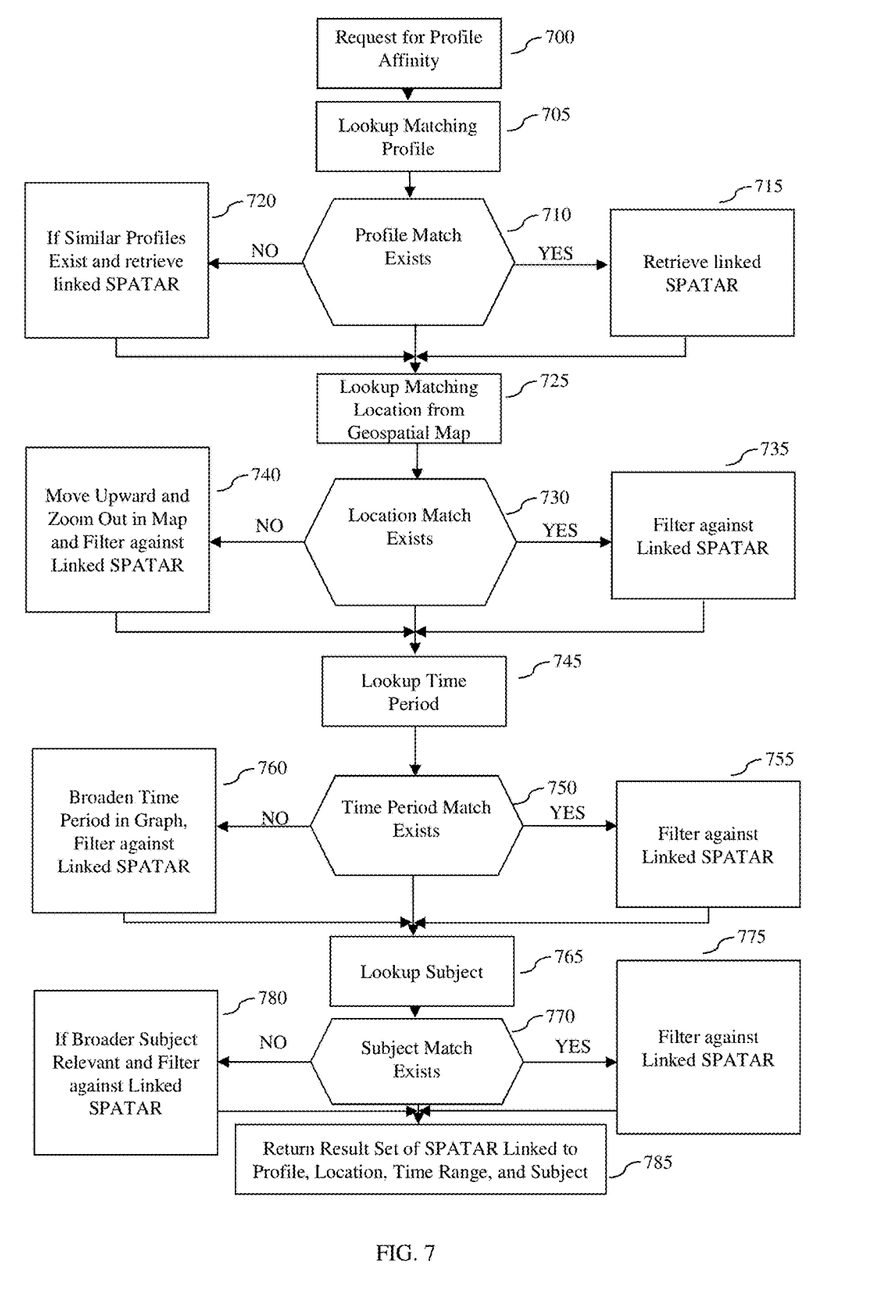
FIG. 7 depicts another exemplary flow for another process in accordance with aspects of the present invention.

FIGS. 6-7 show exemplary flows (or swim lane diagrams) for performing aspects of the present invention. The steps of FIGS. 6-7 may be implemented in the environments of FIGS. 1-4. As noted above, the flowchart(s) illustrate the architecture, functionality, and operation of possible implementations of systems, methods, and computer program products as already described herein in accordance with the various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 6 depicts an exemplary flow for a process in accordance with aspects of the present invention. More specifically, FIG. 6 shows how profile insights in space and time sensitive linkages (SPATALs) are traversed by an apparatus (e.g., profile crawler) to identify space and time affinity clusters (SPATARs). In FIG. 6, at step 600, processes of the present invention read a space time aware linkage (e.g., user preferences or dimensionally aware linkage). In an embodiment, the space time aware linkage (e.g., user preferences or dimensionally aware linkage) may comprise at least two of a profile set, a subject, a time period, and a location. For example, each of the profile set, the subject, the time period, and the location may each comprise a different dimension of the space time aware linkage (e.g., user preferences or dimensionally aware linkage). The space time aware linkage (e.g., user preferences or dimensionally aware linkage) may link each of these dimensions together (i.e., the profile set, the subject, the time period, and the location).

At step 605, processes in embodiments of the present invention perform a lookup of the linkages with a matching subject in aggregated data. At step 610, processes of the present invention determine whether a number of matches exceed a predetermined threshold. The predetermined threshold may be user defined or hard coded in an apparatus (e.g., profile crawler). For example, if the number of matches does not exceed the predetermined threshold (step 610: NO), then processes of the present invention move to a broader subject and reevaluates with the broader subject in step 615. As an example, if the processes determine that a number of matches of the subject "biking" is below a predetermined threshold, then the processes use a broader subject, such as vehicle enthusiasts, and reevaluates if a number of matches of the subject "vehicle enthusiasts" is below a predetermined threshold. Further, in step 615, processes may lower a confidence level of the broader subject. For example, if the processes determine that a number of matches of the subject "biking" is below a predetermined threshold, then the processes determine that this subject is not an accurate insight, and the confidence level of the subject "vehicle enthusiasts" may be lowered. Alternatively, if the number of matches exceed the predetermined threshold (step 610: YES), then the processes identify a new or existing affinity cluster related to the subject in step 620. Further, in step 620, processes may increase the confidence level in step 620.

At step 625, processes in embodiments of the present invention perform a lookup of the linkages with a matching location in the aggregated data. At step 630, processes determine whether a number of matches exceed a predetermined threshold. The predetermined threshold may be user defined or hard coded in an apparatus (e.g., profile crawler), and may be different from the predetermined threshold in step 610. If the number of matches does not exceed the predetermined threshold (step 630: NO), then the processes move upward, zoom out in the map/location, and reevaluates with the zoomed out map/location in step 635. Further, in step 635, processes may lower a confidence level of the zoomed out map/location. Alternatively, if the number of matches exceeds the predetermined threshold (step 630: YES), then the processes identify new or existing affinity cluster related to the location in step 640. Further, in step 640, the processes may increase the confidence level.

At step 645, processes in embodiments of the present invention perform a lookup of the linkages with a matching time period in the aggregated data. For example, at step 650, the processes determine whether a number of matches exceed a predetermined threshold. The predetermined threshold may be user defined or hard coded in an apparatus (e.g., profile crawler), and may be different from the predetermined thresholds in steps 610 and 630. If the number of matches does not exceed the predetermined threshold (step 650: NO), then the processes broaden the time period and reevaluates with the broadened time period in step 655. Further, the processes may lower a confidence level of the broadened time period in step 655. Alternatively, if the number of matches exceeds the predetermined threshold (step 650: YES), then the processes identify new or existing affinity cluster related to the time period in step 660. Further, the processes may increase the confidence level in step 660.

In FIG. 6, at step 665, processes in embodiments of the present invention perform a lookup of the linkages with overlapping profile sets in the aggregated data. At step 670, the processes determine whether a number of matches exceed a predetermined threshold. The predetermined threshold may be user defined or hard coded in an apparatus (e.g., profile crawler), and may be different from the predetermined thresholds in steps 610, 630, and 650. If the number of matches does not exceed the predetermined threshold (step 670: NO), then the processes initiate new space and time affinity clusters (SPATARs) for each cluster identified and link them to profiles, locations, time range, and subject in step 680. Alternatively, if the number of matches exceeds the predetermined threshold (step 670: YES), then the processes identify new or existing affinity cluster for each overlapping set in step 675, and then goes to step 680. After step 680 is performed, the processes read another space time aware linkage (e.g., dimensionally aware linkage) and repeat the process again at step 600.

In a non-limiting example of FIG. 6, a space time aware linkage (e.g., user preferences or dimensionally aware linkage) may comprise linkages between John (e.g., profile set), New York City (e.g., location), Biking (e.g., subject), and Christmas (e.g., time period). At step 600, the processes of the present invention read the space time aware linkage (e.g., dimensionally aware linkage). Then, at step 605, a lookup of linkages is performed in the aggregated data by matching biking (e.g., subject). If a number of matches exceeds a predetermined threshold (step 610: YES), then an affinity cluster is identified related to biking (e.g., biking helmet results may be linked to biking) at step 620. If the number of matches does not exceed the predetermined threshold (step 610: N), then a broader subject is identified, such as vehicle enthusiasts, and a lookup of linkages is performed again with the broader subject (i.e., vehicle enthusiasts) at step 615. The process is repeated for location (steps 625, 630, 635, and 640) and time period (steps 645, 650, 655, and 660). At step 665, a lookup of linkages is performed in the aggregated data by matching John (e.g., profile set). If the number of matches does exceed a predetermined threshold (step 670: YES), then an affinity cluster is identified related to biking (e.g., John's wife Jamie may be linked to biking) at step 675. Then, after step 675, the process continues to stop 680. If the number of matches does not exceed a predetermined threshold (step 670: NO), then a new SPATARs are created for each cluster identified and link to profiles, location, time range, and subject at step 680.

FIG. 7 depicts another exemplary flow for another process in accordance with aspects of the present invention. For example, embodiments FIG. 7 shows the processes of retrieving affinity clusters (i.e., a space time affinity cluster, or SPATAR) that are in a context of location, vicinity, profile set, and time. More specifically, FIG. 7 shows how the processes retrieve profile affinities in order to provide personalized content and services. In FIG. 7, at step 700, there is a request for profile affinity. The profile affinity associates the time period and the location together to form linkages in at least two dimensions. The at least two dimensions can include, e.g., time, location, vicinity, profile, and subject. Then, at step 705, the processes perform a lookup with a matching profile in aggregated data. At step 710, the processes determine whether the profile match exists. If the profile match exists (step 710: YES), the processes retrieve linked SPATAR in step 715. Further, in step 715, processes may increase a confidence level at step 715. Alternatively, if the profile match does not exist (step 710: NO), the processes determine whether a similar profile exists and retrieves linked SPATAR at step 720 if the similar profile exists. Further, the processes may lower the confidence level of the similar profile at step 720.

At step 725, processes in embodiments of the present invention perform a lookup of a matching location from a geospatial map in the aggregated data. At step 730, the processes determine whether a location match exists. If the location match exists (step 730: YES), the processes filter against linked SPATAR in step 735. The processes may increase the confidence level at step 735. Alternatively, if the location match does not exist (step 730: NO), processes zoom out in a map and filter against linked SPATAR at step 740. Further, processes may lower the confidence level of the zoomed out map at step 740.

At step 745, processes in embodiments of the present invention perform a lookup of a time period in the aggregated data. At step 750, processes determine whether a time period match exists. If the time period match exists (step 750: YES), processes filter against linked SPATAR at step 755. Processes in embodiments of the present invention may increase the confidence level at step 755. Alternatively, if the time period match does not exist (step 750: NO), processes broaden the time period in graph and filters against linked SPATAR at step 760. Further, processes may lower the confidence level of the broadened time period at step 760.

At step 765, processes in embodiments of the present invention perform a lookup of a subject in the aggregated data. At step 770, processes determine whether a subject match exists. If the subject match exists (step 770: YES), processes filter against linked SPATAR at step 775. Processes may increase the confidence level at step 775. Alternatively, if the subject match does not exist (step 770: NO), processes broaden the subject to a more relevant subject and filters against linked SPATAR at step 780. Processes may lower the confidence level of the broadened subject at step 780. Then, at step 785, a result set of SPATAR linked to profile, location, time range, and subject is returned in the processes. In FIG. 7, the result set of SPATAR linked to profile, location, time range, and subject is a set of profile information that is sensitive to time and location. Therefore, in an exemplary embodiment, personalized content and services may be provided to at least one individual based on the result set of SPATAR linked to profile, location, time range, and subject that is sensitive to time and location.

In an exemplary embodiment, personalized content and services may be provided by an external device. Therefore, in an exemplary embodiment, a result set of SPATAR linked to profile, location, time range, and subject which is a set of profile information that is sensitive to time and location may be sent from an apparatus (e.g., profile crawler) to an external device for providing the personalized content and services. The external device may be, for example, one of a mobile device, a computing device, a wireless device, etc. Further, the external device may use the result set of SPATAR linked to profile, location, time, range, and subject for determining the personalized content and services. For example, the external device may retrieve insights using the set of profile information to provide personalized content and services. Thus, the external device may analyze the set of profile information (i.e., profile, location, time, range, and subject), determine the corresponding personalized content and services, and provide the corresponding personalized content and services (e.g., an advertisement) targeted for a specific user based on the set of profile information. Further, the external device may send the personalized content and services back to the apparatus (e.g., profile crawler) described with regards to FIGS. 6 and 7. For example, if the set of profile information includes a user who is currently discussing audio equipment in Portland, the external device may analyze the profile information received from the apparatus (e.g., profile crawler) and provide the user with an advertisement for Bose speakers and a location of a Bose store in the Portland area through the apparatus (e.g., profile crawler).

Although an exemplary embodiment describes an external device providing the personalized content and services, embodiments are not limited. In another embodiment, the personalized content and services may be analyzed, determined, and provided in the same apparatus (e.g., profile crawler) as described with regards to FIGS. 6 and 7 instead of being performed in an external device.

For example, based on a linkage of the profile, location, time range, and subject, the method and system may determine a relevant television program based on the result set of SPATAR. As shown in the non-limiting example described above, a space time aware linkage (e.g., user preferences or dimensionally aware linkage) may comprise linkages between John (e.g., profile set), New York City (e.g., location), Biking (e.g., subject), and Christmas (e.g., time period). Therefore, if there is a television program about biking in the winter and is based in New York City, the television program may be provided to at least one individual based on the result set of SPATAR. In another non-limiting example, if most bikers in New York City buy a special type of helmet, the helmet may also be suggested to at least one individual based on the result set of SPATAR. Therefore, the method and system described herein use the result set of SPATAR in order to provide personalized content and services based on the linkages between the profile, location, time and subject, which is accumulated based on multiple data sets.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The systems and processes described herein provide a computer-implemented method for providing personalized content and services based on profile information that is sensitive to time and location. In this case, a computer infrastructure, such as computer system shown in FIG. 1 or the cloud environment shown in FIG. 2 can be provided and one or more systems for performing the processes of the invention can be obtained (e.g., created, purchased, used, modified, etc.) and deployed to the computer infrastructure. To this extent, the deployment of a system can comprise one or more of:

(i) installing program code on a computing device, such as computer system shown in FIG. 1, from a computer-readable medium;

(ii) adding one or more computing devices to the computer infrastructure and more specifically the cloud environment; and (iii) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system implemented in a computer infrastructure including a processor configured to:

receive, by the processor, dimensionally aware linkages in at least two dimensions including a time period and a location on a geospatial map;

retrieve, by the processor, aggregated data from a data set of mobile data, social media data, Internet data, private network data, and cloud computing data;

identify, by the processor, at least one affinity cluster related to the dimensionally aware linkages in the at least two dimensions and the retrieved aggregated data by performing at least one lookup linkage which matches at least one dimension of the at least two dimensions of the dimensionally aware linkages with the retrieved aggregated data; and provide, by the processor, personalized content dynamically and in real-time with a high level of confidence to a user having same or similar user preferences as the received dimensionally aware linkages based on the identified at least one affinity cluster, wherein the dimensionally aware linkages associate the time period and the location together to form linkages in the at least two dimensions, the processor comprises a profile crawler which is configured to self-learn based on behavioral patterns, the received dimensionally aware linkages, and the at least one affinity cluster, and the processor is further configured to:

increase a confidence level of the identified at least one affinity cluster for providing the personalized content in response to a number of matches of the at least one dimension of the dimensionally aware linkages exceeding a predetermined threshold, decrease the confidence level of the identified at least one affinity cluster for providing the personalized content in response to the number of matches of the at least one dimension of the dimensionally aware linkages not exceeding the predetermined threshold, broaden a first dimension of the dimensionally aware linkages in response to a number of matches of the first dimension of the dimensionally aware linkages not exceeding a first predetermined threshold and reevaluating the broader first dimension to identify a first affinity cluster, and broaden a second dimension of the dimensionally aware linkages in response to a number of matches of the second dimension of the dimensionally aware linkages not exceeding a second predetermined threshold and reevaluating the broader second dimension to identify a second affinity cluster.

2. The system of claim 1, wherein the data set further comprises machine-generated data, navigational data, and vehicle data.

3. The system of claim 1, wherein the at least two dimensions further comprises a profile set and a subject.

4. The system of claim 1, wherein the personalized content comprises at least one of an audio selection, a video selection, a television program, and a campaign.

5. The system of claim 1, wherein the processor configured to identify the at least one affinity cluster further comprises:
  performing first lookup linkages which match the first dimension of the at least two dimensions of the dimensionally aware linkages with the retrieved aggregated data;
  identifying the first affinity cluster related to the first dimension of the dimensionally aware linkages in response to the number of matches of the first dimension of the dimensionally aware linkages exceeding the first predetermined threshold;
  performing second lookup linkages which match the second dimension of the at least two dimensions of the dimensionally aware linkages with the retrieved aggregated data;
  identifying the second affinity cluster related to the second dimension of the dimensionally aware linkages in response to the number of matches of the second dimension of the dimensionally aware linkages exceeding the second predetermined threshold; and
  providing the personalized content based on the identified at least one affinity cluster which comprises the first affinity cluster and the second affinity cluster.

6. The system of claim 1, wherein the processor is further configured to associate at least one of a subject and a profile set to the identified at least one affinity cluster based on the dimensionally aware linkages in the at least two dimensions and the retrieved aggregated data in order to provide the personalized content to the user having same or similar user preferences as the received dimensionally aware linkages.

7. The system of claim 1, wherein the predetermined threshold is hard coded in the profile crawler.

8. The system of claim 7, wherein the predetermined threshold is a same number as the first predetermined threshold and the second predetermined threshold.

9. A method comprising:
  receiving, by a computer processor, a request for a profile affinity which comprises at least two dimensions including a time period and a location on a geospatial map;
  comparing, by the computer processor, at least one dimension of the profile affinity which comprises the at least two dimensions with aggregated data in order to dynamically and in real-time with a high level of confidence find a match between the at least one dimension of the profile affinity which comprises the at least two dimensions and the aggregated data;
  increasing, by the computer processor, a confidence level for providing personalized content in response to the match existing between the at least one dimension of the profile affinity and the aggregated data; and
  decreasing, by the computer processor, the confidence level for providing the personalized content in response to the match not existing between the at least one dimension of the profile affinity and the aggregated data;
  broadening, by the computer processor, a first dimension of the at least one dimension in response to the match not existing between the first dimension of the profile affinity and the aggregated data, and reevaluating the broader first dimension to identify a first affinity cluster, and
  broadening, by the computer processor, a second dimension of the at least one dimension in response to the match not existing between the second dimension of the profile affinity and the aggregated data, and reevaluating the broader second dimension to identify a second affinity cluster,
  wherein the aggregated data comprises a data set of mobile data, social media data, Internet data, private network data, and cloud computing data,
  the profile affinity associates the time period and the location together to form linkages in the at least two dimensions, and
  the computer processor comprises a profile crawler which is configured to self-learn based on behavioral patterns, the linkages in the at least two dimensions, and the profile affinity.

10. The method of claim 9, wherein the at least two dimensions further comprises a profile set and a subject.

11. The method of claim 9, further comprising retrieving linked affinity clusters in response to the match existing between the at least one dimension of the profile affinity and the aggregated data.

12. The method of claim 9, further comprising:
  retrieving linked affinity clusters in response to a match existing between the broadened at least one dimension of the profile affinity and the aggregated data.

13. The method of claim 9, wherein the personalized content comprises at least one of an audio selection, a video selection, a television program, and a campaign.

14. A computer program product for providing at least one service, the computer program product comprising a computer readable hardware storage device having readable program code stored thereon, the program code comprising:
  first program code executable by a processor to obtain dimensionally aware linkages in at least two dimensions including a time period and a location on a geospatial map;
  second program code executable by the processor to obtain aggregate data from a data set of mobile data, social media data, Internet data, private network data, and cloud computing data;
  third program code executable by the processor to identify at least one affinity cluster related to the dimensionally aware linkages in the at least two dimensions and the obtained aggregated data by performing at least one lookup linkage which matches at least one dimension of the at least two dimensions of the dimensionally aware linkages with the obtained aggregated data; and
  fourth program code executable by the processor to provide the at least one service dynamically and in real-time with a high level of confidence to a user having same or similar user preferences as the obtained dimensionally aware linkages based on the identified at least one affinity cluster;
  fifth program code executable by the processor to increase a confidence level of the identified at least one affinity cluster for providing the at least one service in response to a number of matches of the at least two dimensions of the dimensionally aware linkages exceeding a predetermined threshold;
  sixth program code executable by the processor to decrease the confidence level of the identified at least one affinity cluster for providing the at least one service in response to the number of matches of the at least two dimensions of the dimensionally aware linkages not exceeding the predetermined threshold;

seventh program code executable by the processor to broaden a first dimension of the dimensionally aware linkages in response to a number of matches of the first dimension of the dimensionally aware linkages not exceeding a first predetermined threshold and reevaluating the broader first dimension to identify a first affinity cluster; and eighth program code executable by the processor to broaden a second dimension of the dimensionally aware linkages in response to a number of matches of the second dimension of the dimensionally aware linkages not exceeding a second predetermined threshold and reevaluating the broader second dimension to identify a second affinity cluster, wherein the dimensionally aware linkages associate the time period and the location together to form linkages in the at least two dimensions, and the processor comprises a profile crawler which is configured to self-learn based on behavioral patterns, the received dimensionally aware linkages, and the at least one affinity cluster.

15. The computer program product of claim 14, wherein the data set further comprises machine-generated data, navigational data, and vehicle data.

16. The computer program product of claim 14, wherein the at least one service comprises at least one of an insight, a recommendation, and an alert.

17. The computer program product of claim 14, wherein the at least two dimensions further comprises a profile set and a subject.

* * * * *